United States Patent
Scheibe et al.

(10) Patent No.: US 11,326,710 B2
(45) Date of Patent: May 10, 2022

(54) VALVE WITH ELECTRODYNAMIC ACTUATOR

(71) Applicant: Buerkert Werke GmbH & Co. KG, Ingelfingen (DE)

(72) Inventors: Ralf Scheibe, Ingelfingen (DE); Sebastian Hettinger, Ingelfingen (DE); Christina Ripsam, Ingelfingen (DE); Holger Schwab, Ingelfingen (DE); Simone Knauss, Ingelfingen (DE); Johannes Baumann, Ingelfingen (DE); Christian Hartmann, Ingelfingen (DE); Rainer Kuenzler, Ingelfingen (DE)

(73) Assignee: Buerkert Werke GmbH & Co. KG

( * ) Notice: Subject to any disclaimer, the term of this patent is extended or adjusted under 35 U.S.C. 154(b) by 0 days.

(21) Appl. No.: 17/021,155

(22) Filed: Sep. 15, 2020

(65) Prior Publication Data

US 2020/0408325 A1    Dec. 31, 2020

Related U.S. Application Data

(62) Division of application No. 16/223,469, filed on Dec. 18, 2018, now abandoned.

(30) Foreign Application Priority Data

Dec. 22, 2017    (DE) ..................... 10 2017 131 246.3

(51) Int. Cl.
*F16K 27/02*    (2006.01)
*F16K 31/06*    (2006.01)
*F16K 17/02*    (2006.01)

(52) U.S. Cl.
CPC .......... *F16K 31/0675* (2013.01); *F16K 17/02* (2013.01); *F16K 27/029* (2013.01);
(Continued)

(58) Field of Classification Search
CPC .... F16K 27/029; F16K 27/12; F16K 31/0682; F16K 99/0046; Y10T 137/5987; Y10T 137/87855; Y10T 137/86622
See application file for complete search history.

(56) References Cited

U.S. PATENT DOCUMENTS 3,420,494 A * 1/1969 Otto ..................... F16K 31/0682
251/129.03
3,613,518 A    10/1971 Prosser
(Continued)

FOREIGN PATENT DOCUMENTS

DE    102013110029 B4    5/2015

*Primary Examiner* — Matthew W Jellett
(74) *Attorney, Agent, or Firm* — Carlson, Gaskey & Olds, P.C.

(57) ABSTRACT

A valve with an electrodynamic actuator includes a magnet device that generates a magnetic field and a drive element that is movable relative to the magnet device. The drive element is pivotally mounted and comprises a current-carrying air coil that is arranged in the magnetic field and is fixedly coupled to a coil carrier made of a non-magnetic material. Sealing surfaces for sealing valve seats are arranged on two opposite sides of the drive element, such that the sealing surfaces face in opposite directions. A housing is comprised of a plurality of plastic housing parts and a metallic encasement. The metallic encasement surrounds an upper area of the housing in which the electrodynamic actuator is arranged and at least partially surrounds a lower area of the housing in which fluid channels are arranged.

18 Claims, 8 Drawing Sheets

(52) U.S. Cl.
CPC ...... *F16K 31/0627* (2013.01); *F16K 31/0682* (2013.01); *Y10T 137/5987* (2015.04); *Y10T 137/86622* (2015.04); *Y10T 137/87885* (2015.04)

(56) References Cited

U.S. PATENT DOCUMENTS

| | | | | |
|---|---|---|---|---|
| 3,982,562 | A * | 9/1976 | Pickett | F16K 31/105 137/625.4 |
| 4,516,605 | A | 5/1985 | Taplin | |
| 4,534,381 | A * | 8/1985 | Hozumi | F16K 31/0682 137/625.65 |
| 4,765,370 | A | 8/1988 | Arizzumi et al. | |
| 5,236,017 | A * | 8/1993 | Meyer | F16K 11/0655 137/625.25 |
| 5,259,415 | A * | 11/1993 | Hess | F16K 31/082 137/625.44 |
| 6,076,803 | A * | 6/2000 | Johnson | F16K 31/0651 251/129.22 |
| 6,776,192 | B2 * | 8/2004 | Wigmore | F15B 13/0814 137/884 |
| 9,249,895 | B2 * | 2/2016 | Hettinger | F16K 7/14 |
| 10,989,323 | B2 * | 4/2021 | Beuschel | F16K 31/0627 |
| 2003/0107018 | A1 * | 6/2003 | Hettinger | F16K 11/052 251/129.19 |
| 2004/0222397 | A1 * | 11/2004 | Hayashi | F16K 31/0679 251/129.09 |
| 2009/0309055 | A1 | 12/2009 | Scheibe | |
| 2015/0069860 | A1 * | 3/2015 | Reiter | F04B 19/006 310/12.16 |
| 2017/0314699 | A1 * | 11/2017 | Vogt | F16K 31/0679 |

\* cited by examiner

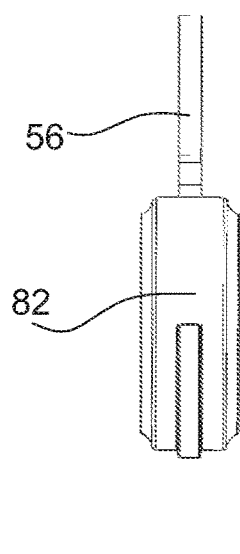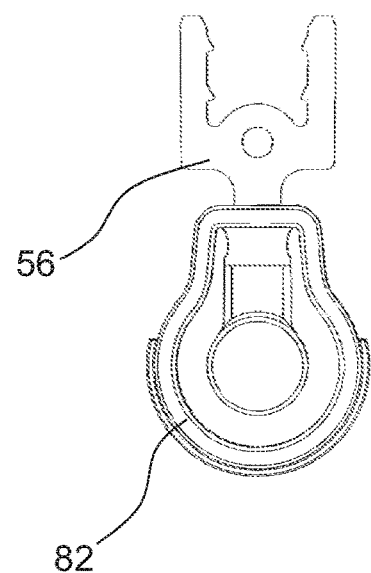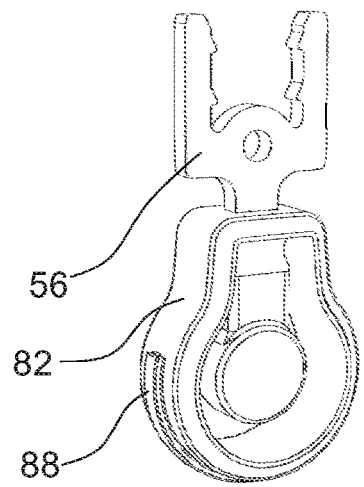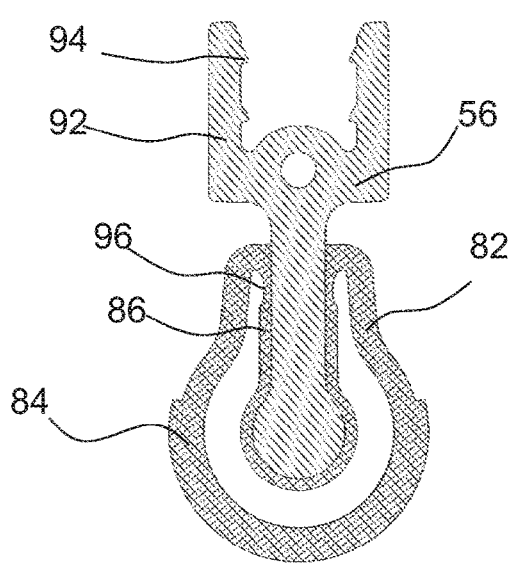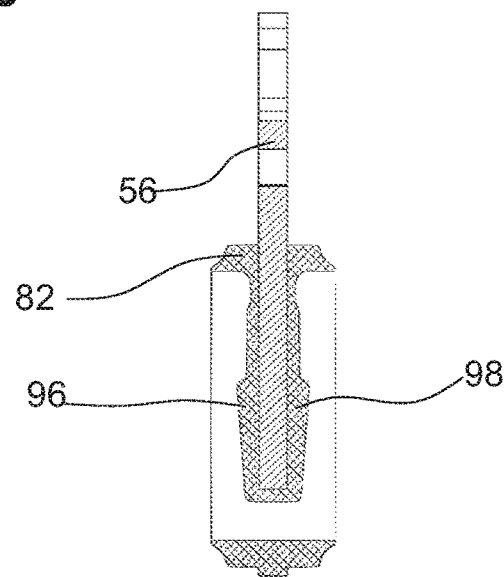

VALVE WITH ELECTRODYNAMIC ACTUATOR

CROSS-REFERENCE TO RELATED APPLICATIONS

This application is a divisional of U.S. application Ser. No. 16/223,469, filed Dec. 18, 2018, which claims priority to German Application No. 10 2017 131 246.3 filed on Dec. 22, 2017, which is incorporated herein by herein in its entirety

TECHNICAL FIELD

The disclosure relates to a valve with an electrodynamic actuator.

BACKGROUND

Valves with electromagnetic actuators are frequently used in fluid technology. In most of these actuators, an armature made of magnetic material is moved via a magnetic field generated by a coil.

In contrast, the magnetic field strength of electrodynamic drives depends on the volume of the permanent magnets used in the drive, whereby a reduction in the volume of the permanent magnets has a comparatively smaller effect on the magnetic field strength available in the drive than a reduction in the coil size of an electromagnetic actuator. Thus, comparatively high magnetic forces can be generated with an electrodynamic drive. An electrodynamic actuator, for example, is known from DE 10 2013 110 029 B4.

Valves are known wherein valve seats are sealed by a diaphragm, which is pressed onto the respective valve seat by an actuator. However, the use of a diaphragm limits the maximum working pressure.

SUMMARY

Therefore, a valve is provided that allows a high solenoid force, a large stroke, and a high working pressure.

This valve has an electrodynamic actuator comprising a magnet device that generates a magnetic field, and a drive element that is movable relative to the magnet device. The drive element is pivotally mounted and comprises a current-carrying air coil that is arranged in the magnetic field and is fixedly coupled to a coil carrier made of a non-magnetic material. Sealing surfaces for sealing valve seats are arranged on two opposite sides of the drive element, such that the sealing surfaces face in opposite directions. The valve comprises a housing which is comprised of several plastic housing parts and a metallic encasement, wherein the metallic encasement surrounds an upper area of the housing in which the actuator is arranged and at least partially surrounds a lower area of the housing in which fluid channels are arranged.

Opposite sides refer to two sides facing in opposite directions. This means that the sealing surfaces face in opposite directions. The sides can be parallel to each other or inclined to each other.

The disclosure is based on the basic idea that the Lorentz force can be used as the driving force for an actuator if the actuator's drive element has a coil arranged in a magnetic field which is supplied with current to deflect the drive element. This concept is implemented particularly effectively in this disclosure by using an air coil as the coil, which is firmly coupled to a non-magnetic coil carrier. An air coil is known to be a wire wound around a non-soft magnetic material (usually air) without a soft magnetic core. The non-magnetic coil carrier should not be magnetizable and may, for example, be made of plastic.

Since the distance between the air coil and the magnetic field is constant with the valve according to the disclosure, the force does not change due to a change in the stroke. This allows large strokes with relatively large force transmission to be achieved, while with conventional solenoid valves the available force decreases sharply with the stroke. This makes high working pressures possible, which means that reliable sealing of the valve seats can be achieved.

Since the valve seats are sealed directly by the sealing surfaces arranged on opposite sides of the drive element, there is no need for a diaphragm.

According to one embodiment, the drive element is encased in an elastomer part. This can dampen impact noises so that the valve is particularly quiet in operation and switching noises are avoided as far as possible. In this context, it is important to note that the valve is particularly quiet, as the Lorentz principle does not allow metal to metal, which is the case with conventional solenoid valves.

The elastomer part can comprise two sealing sections arranged on the sealing surfaces of the drive element. This has the advantage that the valve seats can be sealed particularly reliably. Unevenness and manufacturing tolerances on a valve seat or on the sealing surfaces of the drive element can be compensated by the sealing sections.

The elastomer part preferably has a pear-shaped section and a tongue-shaped section, the tongue-shaped section projecting into the pear-shaped section and encasing the drive element. The pear-shaped section of the elastomer part can be used to seal housing parts that can be joined together to form a valve housing. Because the tongue-shaped section encases the drive element, the elastomer part is reliably attached to the drive element and cannot be unintentionally detached from it even if the drive element moves.

According to one embodiment, the elastomer part has a mounting aid. The mounting aid, for example, is molded onto the elastomer part, in particular in the form of a bead on the pear-shaped section of the elastomer part. The mounting aid can, for example, be clamped between two housing parts during assembly, so that the pear-shaped section is fixed in a fixed position. At the same time, the mounting aid can be used to correctly position the elastomer part by aligning the mounting aid to a corresponding geometry on a housing part.

By the valve having two valve seats preferably facing each other, in particular by the valve seats not lying in the same plane, good sealing of the valve seats is possible. By pivoting the drive element, the opposite valve seats can each be sealed with one of the sealing surfaces arranged on opposite sides of the drive element. The drive element can be pressed onto the valve seats with a relatively high pressure.

The drive element may have a toothing, the coil carrier being firmly connected to the drive element by the toothing. In particular, the drive element can be clawed into the coil carrier by the toothing, so that the drive element and the coil carrier cannot be detached from each other without destruction anymore. The coil carrier and the drive element can thus be advantageously connected to each other without further connectors. The toothing can be formed integrally in the drive element.

The valve preferably has a housing, the housing being formed at least partly from plastic and partly from a metallic encasement. For example, the housing comprises several plastic parts that can be produced by injection molding. Fasteners or fluid channels can be formed particularly easily in the plastic parts. The metallic encasement serves on the one hand to shield the valve and as a magnetic guide plate. For this purpose, the metallic encasement is made of a magnetically conductive steel, for example. In addition, the metallic encasement improves heat dissipation.

For example, the housing comprises at least two plastic parts that engage with each other, with the metallic encasement being put over the plastic housing parts to hold the plastic parts together. In particular, the metallic encasement surrounds the at least two plastic parts in such a way that they cannot separate from each other. This eliminates the need for fasteners to connect the housing parts. The housing parts can thus be manufactured particularly easily, since, for example, no or fewer latching elements or similar connecting elements are required. According to one embodiment, reinforcing plates made of a soft magnetic material are provided.

The reinforcing plates may be arranged inside the housing between the metallic encasement and a permanent magnet, respectively.

The drive element is preferably mounted pivotably about an axis of rotation parallel to the main directions of the magnetic fields. Here, the Lorentz force is optimally used as the driving force for a pivoting movement. Such a design is particularly suitable for the alternating opening and closing of two oppositely arranged valve seats.

According to one embodiment, a first half of the air coil is arranged in a first magnetic field with a first main direction and the second half of the air coil is arranged in a second magnetic field with a second main direction opposite to the first main direction. In such a configuration, the different polarity (north/south pole) of adjacent permanent magnets can be effectively used to utilize a large portion of the winding sections to generate the driving force. Since most of the current in the winding halves of the air coil flows in opposite directions, a Lorentz force is generated in both cases which acts in the same direction, resulting in a large total driving force.

Particularly advantageous is the use of an air coil which generally has the shape of an oval with a longitudinal axis, preferably the shape of two complementary semicircles spaced apart with a linear center piece connecting the semicircles, the longitudinal axis dividing the air coil into the two halves through which oppositely oriented magnetic fields pass. An oval shape of the air coil has the advantage that larger winding sections can be achieved than with a circular coil which contribute to force generation. This means that more force is available in the direction of movement of the drive element. In principle, however, circular or angular coils can also be used.

According to one embodiment, a reset element is provided which exerts a bias force on the drive element and forms at least part of an electrically conductive connection between a winding end of the air coil and an electrical connection of the actuator. The reset element thus fulfils a dual function by pretensioning the drive element to a certain switching position or operating position on the one hand and on the other hand making an otherwise required wire connection or the like superfluous.

Alternatively, contact can also be made via a wire connection. In this case, care must be taken to ensure that the flexibility of the wire ends is guaranteed, as they move along during the switching process. For this purpose, the wire ends can, for example, be coated with PTFE.

A leaf spring or a coil spring, for example, is suitable as a reset element. Several spring elements can also form a reset element together.

According to one embodiment, the magnet device and the drive element of the electrodynamic actuator can be accommodated in an actuator housing that shields the magnetic fields of the magnet device. This avoids interference with adjacent electrical and/or magnetic equipment.

According to one embodiment, the electrodynamic actuator is equipped with reinforcing plates, especially yoke plates, made of a soft magnetic material, which fulfil a double function: On the one hand they amplify the magnetic fields of the magnet device, on the other hand they shield the magnetic fields from the outside. The use of such yoke plates allows an actuator housing made of plastic to be provided if a stronger shielding is not necessary.

In an exemplary embodiment, the reinforcing plates, in particular yoke plates, made of soft magnetic material with magnetic field amplification and shielding properties form the housing of the actuator.

In another embodiment, the reinforcing plates are arranged inside the housing, for example, between the metallic sheathing and a permanent magnet.

BRIEF DESCRIPTION OF THE DRAWINGS

Further features and advantages of the disclosure result from the following description and from the following drawings to which reference is made. In the drawings:

FIGS. 7a and 7b show different sections of a drive element.

DETAILED DESCRIPTION

Figure 1:
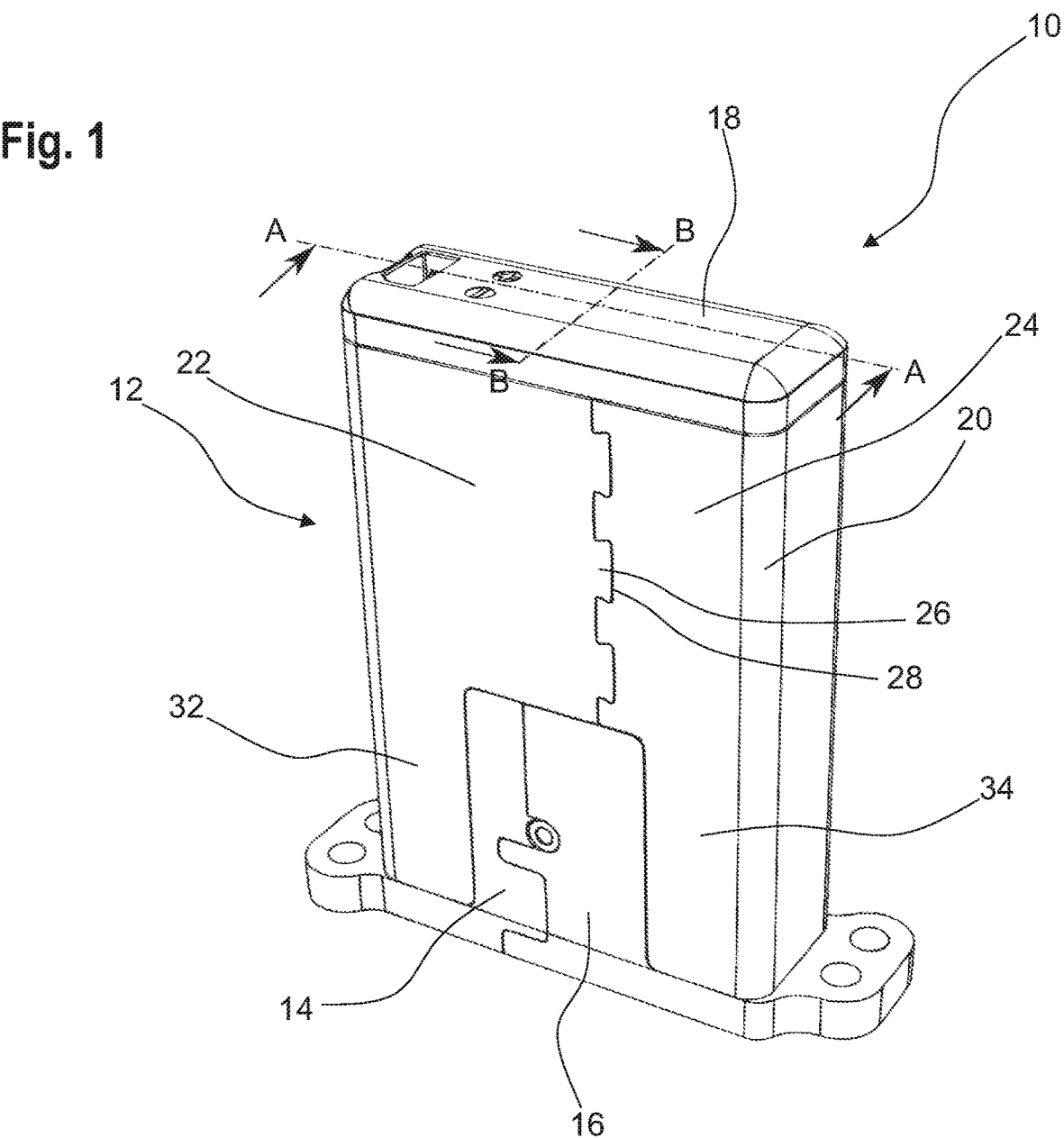
FIG. 1 shows a valve according to the disclosure.

FIG. 1 shows a valve 10, which has a housing 12. The housing 12 is comprised of several plastic housing parts 14, 16, 18 and a metallic encasement 20. The metallic encasement 20 comprises two sheathing parts 22, 24 which are inserted into each other and which are at least partially inserted over the plastic housing parts 14, 16. A further plastic housing part 18 forms a cover which closes the housing 12. When assembled, all housing parts 14, 16, 18, 20 form a uniform surface.

The sheathing parts 22, 24 of the metallic encasement 20 preferably comprises a magnetically conductive steel. They each have flaps 26 widening in a direction away from their own sheathing part 22, 24, which engage in corresponding recesses 28 of the respective other sheathing part 22, 24 in order to fasten the sheathing parts 22, 24 together.

In an upper area of the housing 12, in which an actuator 30 is also arranged, the encasement 20 serves as a shield against magnetic fields. This avoids interference with adjacent electrical and/or magnetic equipment. Actuator 30 is visible in FIGS. 3 to 5. In addition, the encasement 20 serves as a magnetic guide plate, which can conduct magnetic fields in a desired direction. In addition, the encasement 20 serves to dissipate heat.

In a lower area of the housing 12, the encasement 20 is designed to save material and mainly has a fastening function. In particular, extensions 32, 34 of the encasement 20 extend into a lower portion of the housing 12. Through extensions 32, 34, the surface area of the encasement 20 is increased so that heat exchange between the encasement 20 and the environment is improved.

Figure 2:
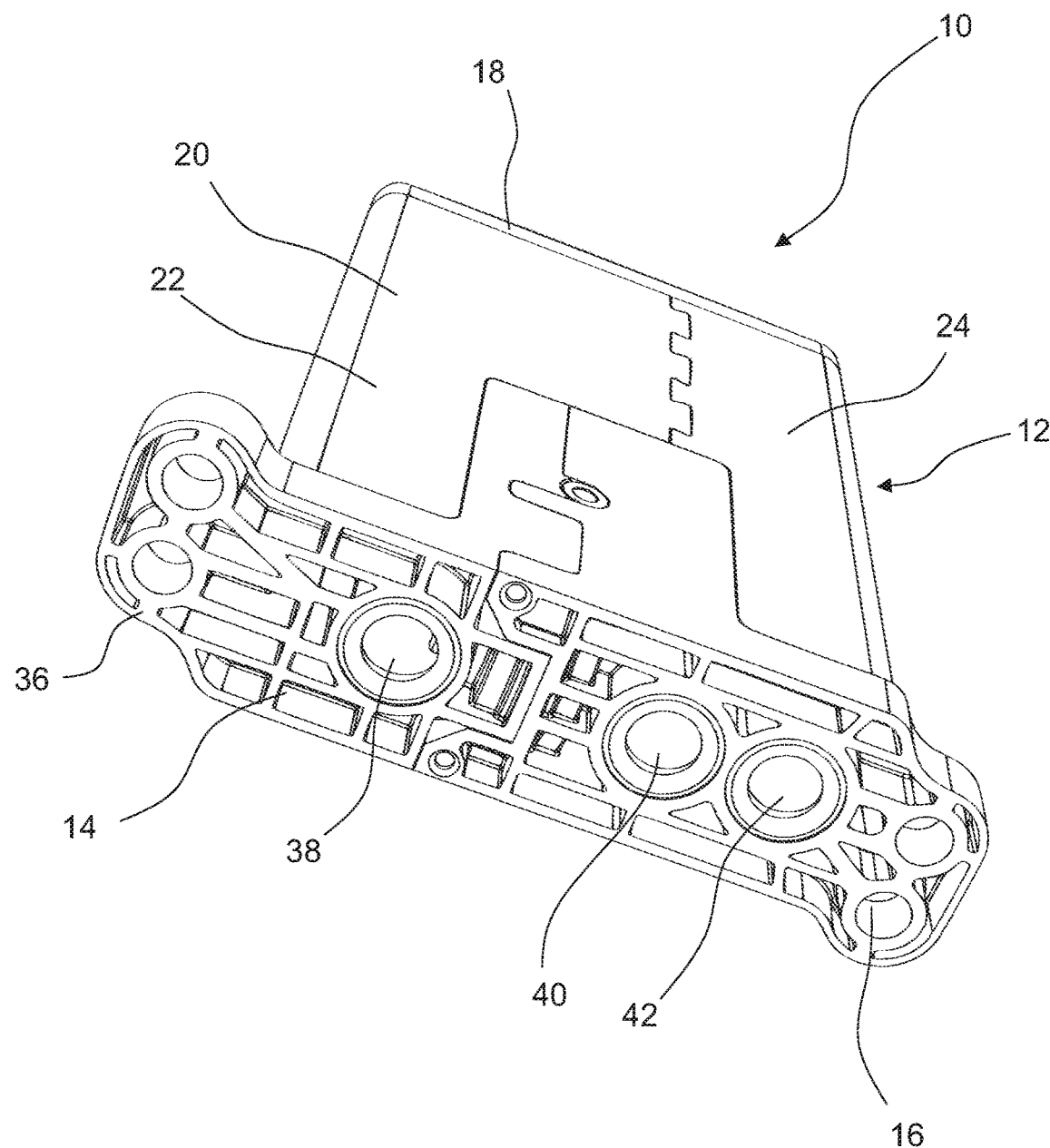
FIG. 2 shows a view of the disclosure valve from below.

FIG. 2 shows the valve 10 in a view from below. A fluid plate 36 is molded to the plastic housing parts 14, 16. Fluid channels 38, 40, 42 are formed in the fluid plate 36. To the fluid channels 38, 40, 42, fluid lines can be connected. The fluid plate 36 also has stiffening ribs and through-holes for fixing the fluid plate 36.

Figure 3:
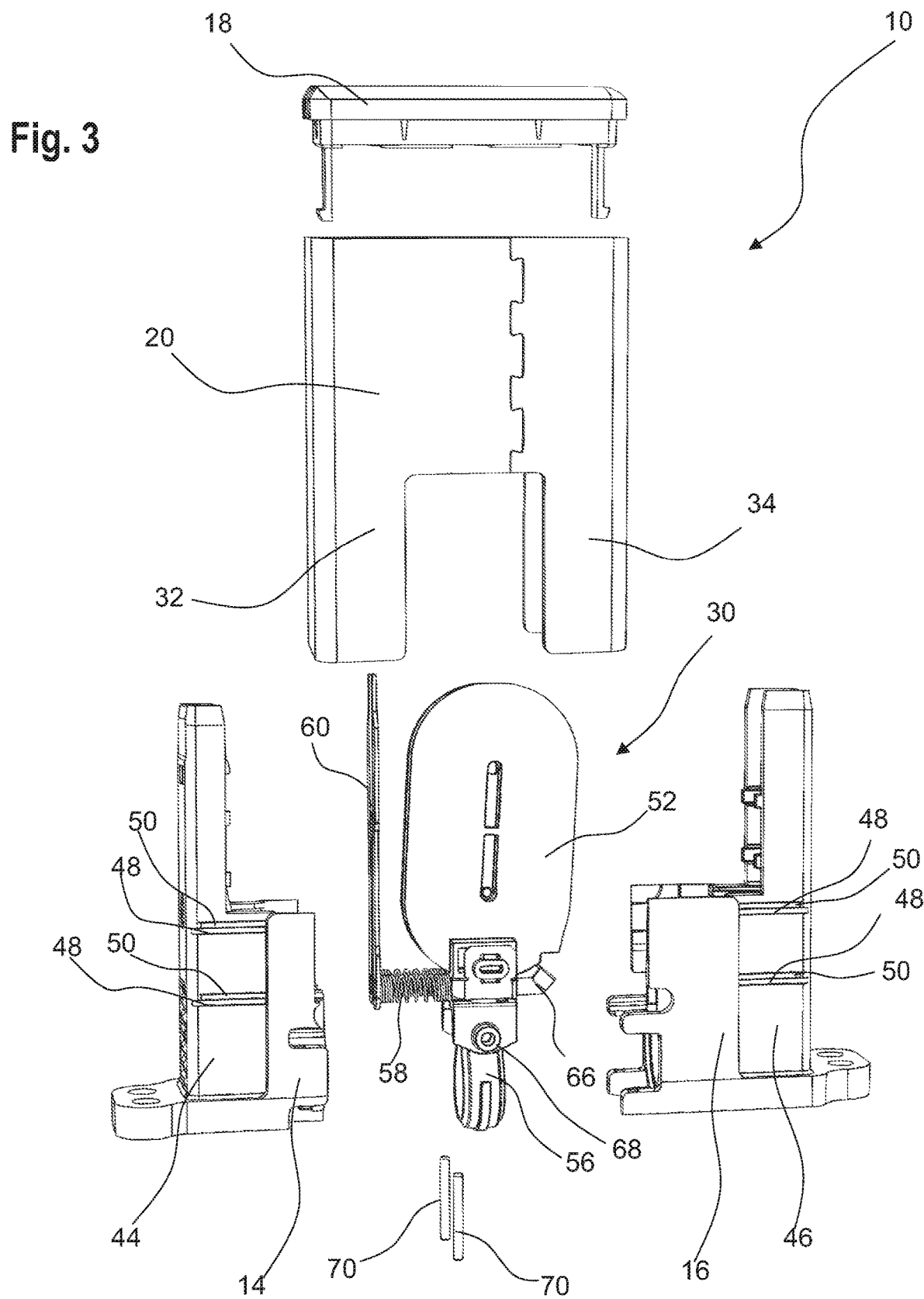
FIG. 3 shows an exploded view of the valve according to the disclosure.

FIG. 3 shows an exploded view of the inventive valve 10 from FIGS. 1 and 2.

The housing parts 14, 16 have mounting areas 44, 46 with which the housing parts 14, 16 engage in the metallic encasement 20, in particular in the extensions 32, 34 of the encasement 20. For example, the housing parts 14, 16 are connected to the encasement 20 by clamping. For this purpose, elevations 48, for example in the form of webs, are provided in the mounting areas 44, 46. The height of the elevations 48 is selected such that a sufficient clamping force is achieved between the housing parts 14, 16 and the encasement 20, such that a secure hold of the encasement 20 on the housing parts 14, 16 is ensured.

Directly adjacent to the elevations 48 indentations 50, in particular grooves, are located. In the indentations 50, any material abrasion that may occur when the encasement 20 is placed on the plastic housing parts 14, 16 may accumulate.

The electrodynamic actuator 30 is arranged in the housing 12. The actuator 30 comprises a coil carrier 52 made of a non-magnetic material with an air coil 54 visible in FIGS. 4 and 5, and a drive element 56 fixed to the coil carrier 52. In addition, the actuator 30 comprises two return springs 58 and two contacts 60, each connecting the coil ends to a positive and a negative pole.

The air coil 54 is firmly connected to the coil carrier 52, i.e. the coil carrier 52 and the air coil 54 always move together. The air coil 54 comprises a plurality of windings around a non-soft magnetic core (air or other non-magnetic material). The windings give the air coil 54 an essentially oval shape with a longitudinal axis perpendicular to the center axis of the air coil 54. In the example shown, the air coil 54 has the shape of two spaced complementary semicircles with a straight center piece connecting the semicircles.

Figure 5:
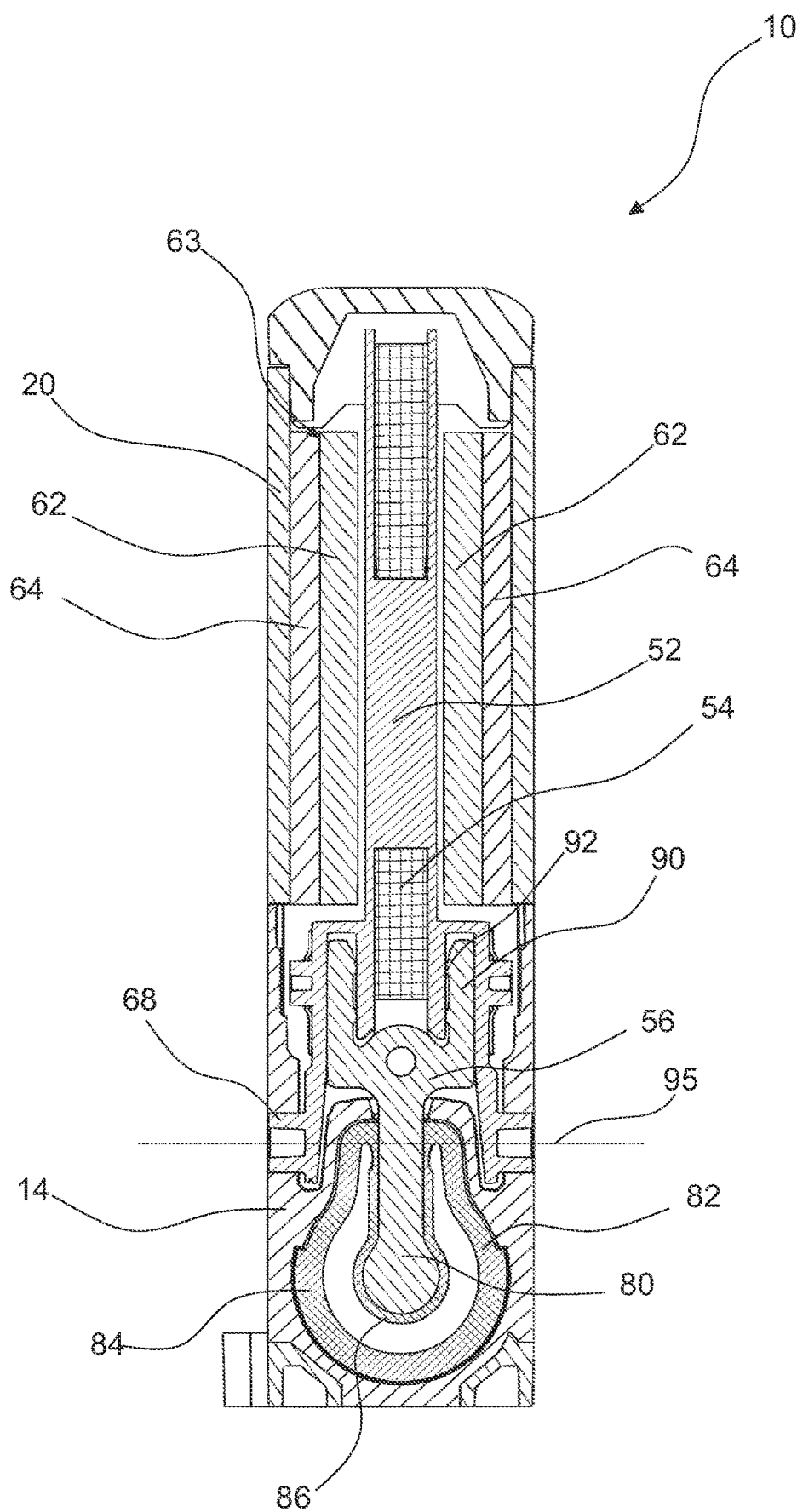
FIG. 5 shows another longitudinal section through the valve along the line B-B in FIG. 1, FIGS. 6a to 6c show different views of a drive element

For sake of better clarity, other parts of actuator 30, for example a magnetic device 63 including permanent magnets 62 and reinforcing plates 64, especially yoke plates, are not shown in FIG. 3. FIG. 5 shows the complete actuator 30.

The air coil 54 can be energized electrically via the springs 58. For better contacting, a contact lug 66 is arranged at each end of the coil wire. A coil wire end can be placed on a contact lug 66 for fastening and the contact lug 66 can then be closed and welded. The contact lugs 66 are electrically conductive and are preferably made of a metallic material. Each spring 58 is placed on one end of a contact lug 66.

The coil carrier 52, in particular the drive element 56, can be loaded by the springs 58 into a position in which a valve seat is sealed when the valve 10 is de-energized.

When the air coil 54 is supplied with direct current via the contacts 60, a Lorentz force acts on the air coil 54. This allows the drive element 56 to be pivoted such that the second valve seat is closed. As soon as the current is switched off, the Lorentz force is omitted and a reset element in the form of springs 58 pushes the drive element 56 back to its initial state.

The coil carrier 52 is pivoted by a bolt 68 in the housing parts 14, 16.

The housing parts 14, 16 have complementary extensions or grooves, which interlock when the housing parts 14, 16 are assembled. The bolt 68 is enclosed between the housing parts 14, 16 and rotatably mounted. Two pins 70, each inserted in coaxially arranged holes in the housing parts 14, 16, secure the connection of the two housing parts 14, 16 to each other.

Figure 4:
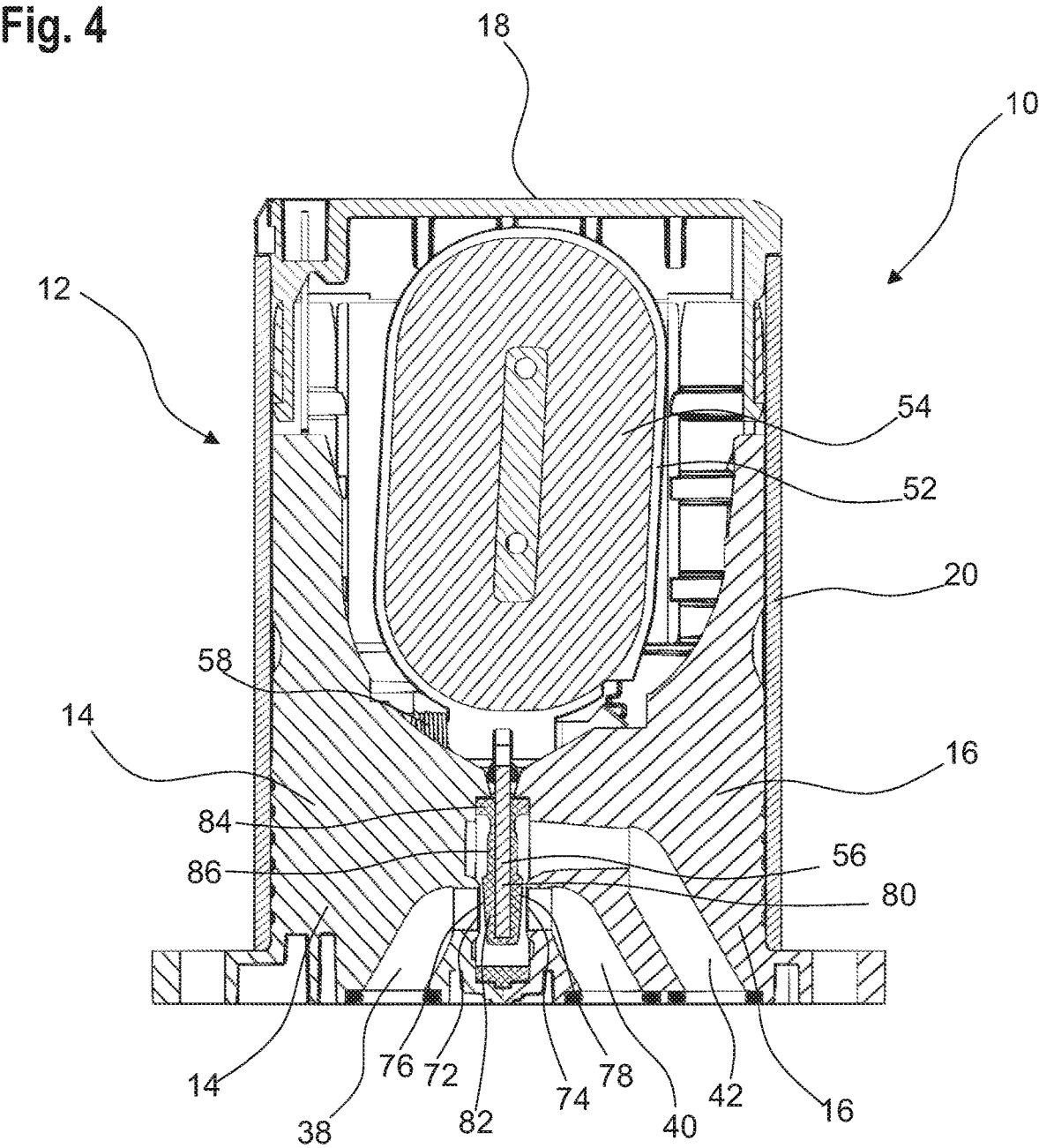
FIG. 4 shows a longitudinal section through the valve along the line A-A in FIG. 1.

FIG. 4 shows a longitudinal view along the line A-A in FIG. 1.

A valve seat 72, 74 is arranged in each case at the ends of the fluid channels 38, 40 lying in the interior of the valve 10, in particular in the interior of the housing parts 14, 16, with the valve seats 72, 74 facing each other.

The course of the fluid channels 38, 40, 42 corresponds at least approximately to the course of a circular path, especially in the area of a deflection. This results in a particularly good flow rate. A rectangular deflection would be easier to make. However, a rectangular deflection would have a negative effect on the flow rate.

The valve seats 72, 74 can each be closed by sealing surfaces 76, 78 arranged on opposite sides of the drive element 56 when the air coil 54 is energized.

The drive element 56 is elongated, with a direction of the longitudinal extent of the drive element 56 extending substantially along the coil longitudinal extent. The drive element 56 preferably has a metallic core 80.

The metallic core 80 of the drive element 56 is at least partially covered by an elastomer part 82. The elastomer part 82 is composed of a pear-shaped section 84 and a tongue-shaped section 86. This is particularly well seen in FIG. 5 or 7a. Instead of a pear shape, other geometries are also conceivable. For example, the elastomer part 82 can also consist of an O-shaped section and a tongue-shaped section.

The sealing surfaces 76, 78 of the drive element 56 are covered by the elastomer part 82, in particular by the tongue-shaped section 86. This allows a particularly reliable sealing of the valve seats 72, 74. In particular, the elastomer part 82 comprises two sealing sections 96, 98 arranged on the sealing surfaces 76, 78 of the drive element 56. The sealing sections 96, 98 can be thickenings of the elastomer part 82 in the tongue-shaped section 86, in particular the sealing sections 96, 98 are formed integrally with the elastomer part 82.

The pear-shaped section 84 of the elastomer part 82 is used to seal the housing parts 14, 16. For this purpose, the elastomer part 82, in particular the pear-shaped section 84 of the elastomer part 82, is clamped between the housing parts 14, 16.

The pear-shaped section 84 forms a closed contour surrounding the drive element 56, in particular the sealing surfaces 76, 78 of the drive element 56. The pear-shaped section 84 is arranged concentrically around the sealing surfaces 76, 78 at least in some areas, as shown in FIG. 5, for example. In order to simplify the positioning or assembly of the elastomer part 82, a mounting aid 88 is provided which is molded onto the elastomer part 82, in particular in the form of a bead. This ensures reliable sealing of the two housing parts 14, 16.

FIG. 5 shows a longitudinal view along the line B-B in FIG. 1.

In this view, the permanent magnets 62 of the magnetic device 63 and the reinforcing plates 64, which serve to amplify the magnetic field, are visible.

The drive element 56 is mounted in the coil carrier 52 via two webs 90. In order to ensure a secure fastening, several teeth 92 are formed on the webs 90, by which the drive element 56 can be clawed into the coil carrier 52. Preferably the drive element 56 is made of metal and the coil carrier 52 of plastic. This allows the teeth 92 to penetrate at least a little into the material of the coil carrier 52. Teeth 92 can be pointed or rounded.

The coil carrier 52 is mounted in the housing 12 such that it can be pivoted about the axis of rotation 95 via the bolts 68. Thus, the coil carrier 52 can be pivoted to seal the valve seats 72, 74 if the air coil 54 is supplied with the appropriate current. The axis of rotation 95 is advantageously below the extension of the elastomer part 82 on the drive element 56. This means that this extension is not moved when the coil carrier 52 pivots, because the pear-shaped section 84 should always be rigid between the housing parts 14, 16 in order to ensure optimum sealing.

FIGS. 6a to 6c show the drive element 56 together with the elastomer part 82 in different views. FIGS. 7a and 7b each show a section through the drive element 56 with the elastomer part 82.

The elastomer part 82 is geometrically optimized below the base of the tongue-shaped section 86 at the pear-shaped section 84, i.e. at the point of movement, in order to avoid cracking. In particular, an indentation 96 is foreseen in this area. The contour of the indentation 96 can be elliptical.

Due to the pear shape, the elastomer part 82 is widened in the area of the sealing surfaces 76, 78. This allows a fluid to flow freely through a fluid channel 38, 40 when the corresponding valve seat 72, 74 is open.

Figure 8:
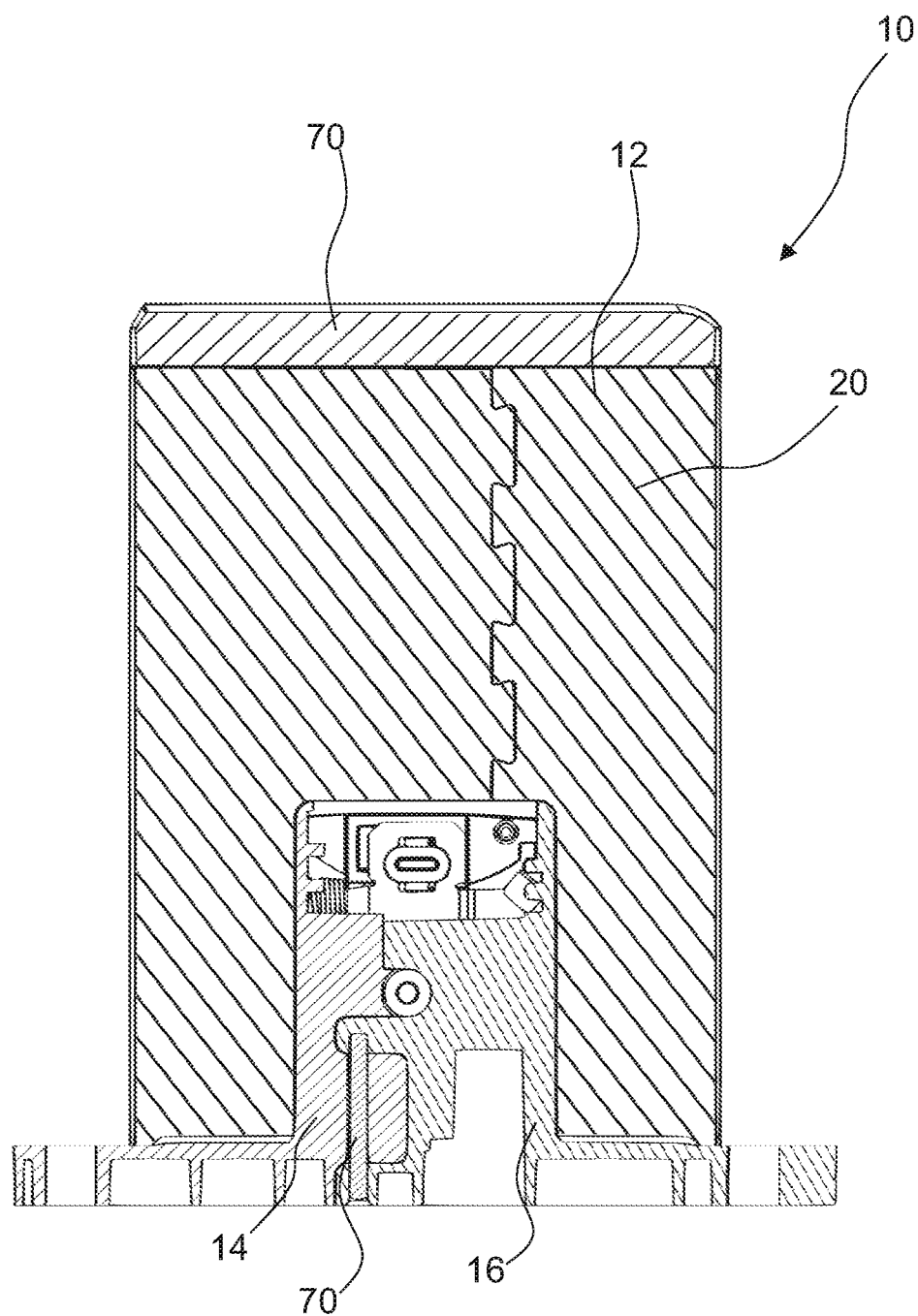
FIG. 8 shows a section through a valve body.

FIG. 8 shows a sectional view of the connection of the two housing parts 14, 16 using pins 70.

Figure 9:
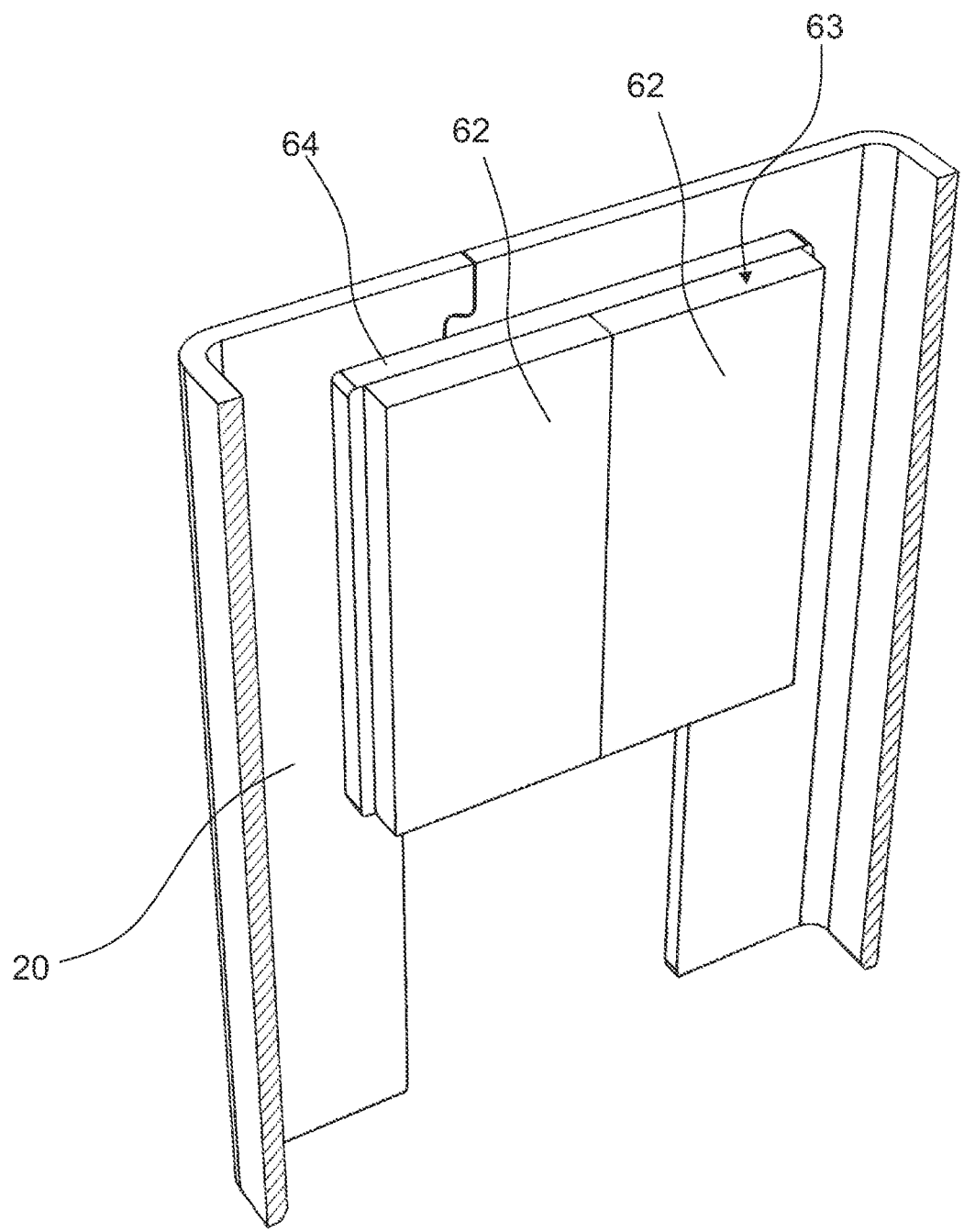
FIG. 9 shows a casing of the valve housing.

FIG. 9 shows the arrangement of the permanent magnets 62 of the magnetic device 63 and the reinforcing plate 64 on the encasement 20.

The valve 10 preferably has several permanent magnets 62. Their magnetic fields can be used most effectively if the permanent magnets 62 are arranged in such a way that their longitudinal axes run parallel to the longitudinal axis of the air coil 54.

In addition, the permanent magnets 62 should be arranged in such a way that opposing permanent magnets 62 always face opposite poles.

The invention claimed is:

1. A valve with an electrodynamic actuator comprising:
a magnet device that generates a magnetic field;
a drive element being movable relative to the magnet device, the drive element being pivotally mounted;
a current-carrying air coil that is arranged in the magnetic field and is fixedly coupled to a coil carrier made of a non-magnetic material, wherein sealing surfaces for sealing valve seats are arranged on two opposite sides of the drive element, such that the sealing surfaces face in opposite directions; and
a housing comprised of a plurality of plastic housing parts and a metallic encasement, wherein the metallic encasement surrounds an upper area of the housing in which the electrodynamic actuator is arranged and at least partially surrounds a lower area of the housing in which fluid channels are arranged.

2. The valve according to claim 1, wherein the metallic encasement comprises two sheathing parts which are inserted into each other and which are at least partially inserted over the plurality of plastic housing parts.

3. The valve according to claim 1, wherein the metallic encasement has extensions extending into the lower area of the housing.

4. The valve according to claim 1, wherein the plurality of plastic housing parts have mounting areas with which the plurality of plastic housing parts engage in the metallic encasement.

5. The valve according to claim 4, wherein the mounting areas engage with extensions of the metallic encasement.

6. The valve according to claim 4, wherein elevations are provided in the mounting areas.

7. The valve according to claim 6, wherein a height of the elevations is selected such that a sufficient clamping force is achieved between the plurality of plastic housing parts and the metallic encasement.

8. The valve according to claim 6, wherein indentations are located directly adjacent to the elevations.

9. The valve according to claim 1, wherein a fluid plate is molded to the plurality of plastic housing parts.

10. The valve according to claim 9, wherein the fluid channels are formed in the fluid plate.

11. The valve according to claim 2, wherein the two sheathing parts each have flaps widening in a direction away from a respective sheathing part.

12. The valve according to claim 11, wherein the flaps engage in corresponding recesses of the respective other sheathing part in order to fasten the two sheathing parts together.

13. The valve according to claim 1, wherein a further plastic housing part forms a cover which closes the housing.

14. The valve according to claim 1, wherein, when assembled, all housing parts of the plurality of housing parts form a uniform surface.

15. The valve according to claim 1, wherein the metallic encasement extends from an upper portion that surrounds the current-carrying air coil to a lower portion that is associated with the lower area in which the fluid channels are arranged.

16. The valve according to claim 15, wherein the metallic encasement comprises two sheathing parts which are coupled to each other at the upper portion and extensions which extend from the upper portion to engage with mounting areas of the plurality of plastic housing parts.

17. The valve according to claim 16, wherein the plurality of plastic housing parts comprises at least a first plastic housing part and a second plastic housing part that are coupled together.

18. The valve according to claim 17, including a fluid plate formed as part of the first and second housing parts, the fluid plate including the fluid channels.

* * * * *